United States Patent
McCrackin et al.

(10) Patent No.: US 11,790,508 B2
(45) Date of Patent: Oct. 17, 2023

(54) COMPUTER VISION PREDICTIONS FOR NON-DESTRUCTIVE TESTING

(71) Applicant: Baker Hughes Holdings LLC, Houston, TX (US)

(72) Inventors: Sheldon McCrackin, Houston, TX (US); Jeremy Vandam, Edmond, OK (US)

(73) Assignee: Baker Hughes Holdings LLC, Houston, TX (US)

( * ) Notice: Subject to any disclaimer, the term of this patent is extended or adjusted under 35 U.S.C. 154(b) by 358 days.

(21) Appl. No.: 17/236,465

(22) Filed: Apr. 21, 2021

(65) Prior Publication Data

US 2022/0343486 A1    Oct. 27, 2022

(51) Int. Cl.
*G06T 7/00* (2017.01)
*G06T 7/246* (2017.01)
*G06N 3/045* (2023.01)

(52) U.S. Cl.
CPC ........... *G06T 7/0004* (2013.01); *G06N 3/045* (2023.01); *G06T 7/251* (2017.01); *G06T 2207/20081* (2013.01); *G06T 2207/20084* (2013.01)

(58) Field of Classification Search
CPC ................... G06T 7/0004; G06T 7/251; G06T 2207/20081; G06T 2207/20084; G06T 2207/10016; G06T 2207/10068; G06T 2207/30164; G06N 3/045; G06N 3/0442; G06N 3/0464

See application file for complete search history.

(56) References Cited

U.S. PATENT DOCUMENTS

| | | | |
|---|---|---|---|
| 10,445,871 B2 | 10/2019 | Lim et al. | |
| 10,621,717 B2 | 4/2020 | Wang et al. | |
| 10,679,066 B2 | 6/2020 | Pathak et al. | |
| 10,769,480 B2 | 9/2020 | Li et al. | |
| 10,861,148 B2 | 12/2020 | Wang et al. | |
| 11,567,201 B2 * | 1/2023 | Zhang | G01S 7/51 |

(Continued)

OTHER PUBLICATIONS

International Search Report and Written Opinion of International Application No. PCT/US2022/071774 dated Aug. 3, 2022, 10 pages.

(Continued)

*Primary Examiner* — Bobbak Safaipour
(74) *Attorney, Agent, or Firm* — MINTZ LEVIN COHN FERRIS GLOVSKY AND POPEO, PC (57) ABSTRACT

Systems and methods for target inspection are provided. The system includes a camera, at least one sensor, and a controller. The camera acquires images of a target over time and the sensor(s) acquire motion data characterizing camera and target movement. The controller generates, using a first computer vision (CV) algorithm, an initial prediction and confidence level regarding an object of interest for a first image acquired at a first time. The controller also determines, using the motion data, a motion parameter characterizing relative motion between the camera and the target at the first time. The controller additionally receives a weighting based upon a second image acquired at a second time prior to the first time. The controller generates, using a second CV algorithm, a final prediction and confidence level for the first image based upon the first image, the initial prediction and confidence level, the motion parameter, and the weighting.

18 Claims, 4 Drawing Sheets

(56) References Cited

U.S. PATENT DOCUMENTS

| | | | |
|---|---|---|---|
| 11,579,629 B2* | 2/2023 | Wu | G06V 20/56 |
| 2019/0146478 A1 | 5/2019 | Celia et al. | |
| 2020/0401888 A1 | 12/2020 | Gugulothu et al. | |
| 2021/0247324 A1* | 8/2021 | Naruse | G06N 20/00 |
| 2022/0335254 A1* | 10/2022 | McCrackin | G06F 18/24 |
| 2022/0341854 A1* | 10/2022 | McCrackin | G06T 7/0004 |
| 2023/0152261 A1* | 5/2023 | Hutchinson | G01N 27/07 |
| | | | 324/650 |

OTHER PUBLICATIONS

Svensen, Markus, et al., "Deep Neural Networks Analysis of Borescope Images", European Conference of the Prognostics and Health Management Society 2018, 8 pages.

Shen, Zejiang, et al., "Deep Learning based Framework for Automatic Damage Detection in Aircraft Engine Borescope Inspection," 2019 International Conference on Computing, Networking and Communication (ICNC): Signal Processing for Communications, 2019, pp. 1005-1010.

* cited by examiner

FIG. 3 (Con't)

COMPUTER VISION PREDICTIONS FOR NON-DESTRUCTIVE TESTING

BACKGROUND

Certain equipment and facilities, such as power generation equipment and facilities, oil and gas equipment and facilities, aircraft equipment and facilities, manufacturing equipment and facilities, and the like, include interrelated systems and processes. For example, power generation plants can include turbine systems and processes for operating and maintaining the turbine systems. Likewise, oil and gas operations can include carbonaceous fuel retrieval systems and processing equipment interconnected via pipelines. Similarly, aircraft systems can include airplanes and maintenance hangars useful in maintaining airworthiness and providing for maintenance support. During equipment operations, the equipment can degrade, encounter undesired conditions such as corrosion, wear and tear, etc., potentially affecting overall equipment effectiveness. Certain inspection techniques, such as non-destructive inspection techniques or non-destructive testing (NDT) techniques, can be used to detect undesired equipment conditions.

SUMMARY

NDT devices can be used to observe the inner mechanisms of complex machines, such as turbines and oil and gas equipment. As an example, NDT devices such as borescopes endoscopes, etc. can be fed through these complex machines to perform maintenance checks without dismantling the whole machine. Such NDT devices can be actuated (e.g., translated, rotated, bent, etc.) in order to maneuver through small openings of these complex machines to allow inspection of these inner components. Acquired NDT inspection data, analysis of the acquired NDT inspection data, storage and/or display of the acquired and analyzed NDT inspection data can be performed by the NDT device, display another computing device, or combinations thereof.

Traditional computer vision algorithms have been employed to make predictions, also referred to as inferences, regarding items of interest captured in single images (e.g., still images or single frames of video) captured by NDT devices during inspection. Examples of predictions can include classification, identification, tracking, and/or quantification (e.g., dimensional measurements), amongst others. However, the predictions generated by traditional computer vision algorithms can be non-optimized, as their accuracy (the percentage of predictions that are correct) is limited by the information available within the single image being analyzed. Accordingly, embodiments of the present disclosure provide inspection systems and corresponding methods that employ computer vision algorithms which remedy this limitation.

In an embodiment, an inspection system is provided and can include a camera, at least one sensor, and a controller. The camera can be configured to acquire a plurality of images of a target over time. The at least one sensor can be configured to acquire motion data characterizing movement of the camera and movement of the target. The controller can include one or more processors in communication with the camera and the at least one sensor. The controller can be configured to receive the plurality of images and the motion data. The controller can also be configured to generate, using a first computer vision algorithm, a first initial prediction and a corresponding first initial prediction confidence level regarding an object of interest for a first image of the plurality of images acquired at a first time. The controller can be further configured to determine, based upon the received motion data, a first motion parameter characterizing relative motion between the camera and the target at the first time. The controller can also be configured to receive a first weighting based upon a second image acquired at a second time prior to the first time. The controller can additionally be configured to generate, using a second computer vision algorithm, a first final prediction and a corresponding first final prediction confidence level for the first image based upon the first image, the first initial prediction, the first initial confidence level, the first motion parameter, and the first weighting. The controller can be further configured to output the first final prediction and the first final prediction confidence level.

In another embodiment, the controller can be further configured to generate the first weighting from a third prediction and a corresponding third prediction confidence level. The third prediction and the third prediction confidence level can be generated using the second computer vision algorithm based upon the second image, a second initial prediction and a corresponding second initial prediction confidence level generated by the first computer vision algorithm for the second image, a second motion parameter characterizing relative motion between the camera and the target at the second time, and a second weighting based upon a third image acquired at a third time prior to the second time.

In another embodiment, the first computer vision algorithm can include a convolutional neural network (CNN) or feature extraction.

In another embodiment, the second computer vision algorithm can include a recurrent neural network (RNN). As an example, the second computer vision algorithm can be a Long Short Term Memory (LSTM) network.

In another embodiment, the initial and final predictions can include at least one of classifying the object of interest, detecting the object of interest, localizing the object of interest, tracking the object of interest, determination of coloration of the object of interest, or characterizing at least one geometric feature of the object of interest.

In another embodiment, the controller can be further configured to determine the initial prediction, the initial prediction confidence level, the final prediction, and the final prediction confidence level for all of the plurality of images.

In another embodiment, the predetermined object of interest can be a defect.

In another embodiment, the motion parameter can be at least one of position, velocity, acceleration, rotation, angular velocity, angular acceleration, rotation angle, or orientation.

In an embodiment, a method of inspecting a target is provided. The method can include capturing, by a camera of an inspection system, a plurality of images of a target over time. The method can also include acquiring, by least one sensor, motion data characterizing movement of the camera and movement of the target. The method can further include receiving by one or more processors in communication with the camera and the at least one sensor, the plurality of images and the motion data. The method can additionally include generating, by the one or more processors using a first computer vision algorithm, a first initial prediction and a corresponding first initial prediction confidence level regarding an object of interest for a first image of the plurality of images acquired at a first time. The method can also include determining, by the one or more processors based upon the received motion data, a first motion parameter characterizing relative motion between the camera and the target at the first time. The method can further include receiving, by the one or more processors, a first weighting based upon a second image acquired at a second time prior to the first time. The method can additionally include generating, by the one or more processors using a second computer vision algorithm, a first final prediction and a corresponding first final prediction confidence level for the first image based upon the first image, the first initial prediction, the first initial confidence level, the first motion parameter, and the first weighting. The method can also include outputting, by the one or more processors, the first final prediction and the first final prediction confidence level.

In another embodiment, the controller is further configured to generate the first weighting from a third prediction and a corresponding third prediction confidence level. The third prediction and the third prediction confidence level can be generated using the second computer vision algorithm based upon the second image, a second initial prediction and a corresponding second initial prediction confidence level generated by the first computer vision algorithm for the second image, a second motion parameter characterizing relative motion between the camera and the target at the second time, and a second weighting based upon a third image acquired at a third time prior to the second time.

In another embodiment, the first computer vision algorithm can include a convolutional neural network (CNN) or feature extraction.

In another embodiment, the second computer vision algorithm can include a recurrent neural network (RNN). As an example, the second computer vision algorithm can be a Long Short Term Memory (LSTM) network.

In another embodiment, the initial and final predictions can include at least one of classifying the object of interest, detecting the object of interest, localizing the object of interest, tracking the object of interest, determination of coloration of the object of interest, or characterizing at least one geometric feature of the object of interest.

In another embodiment, the controller can be further configured to determine the initial prediction, the initial prediction confidence level, the final prediction, and the final prediction confidence level for all of the plurality of images.

In another embodiment, the predetermined object of interest can be a defect.

In another embodiment, the motion parameter can include at least one of position, velocity, acceleration, rotation, angular velocity, angular acceleration, rotation angle, or orientation.

DESCRIPTION OF DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure.

DETAILED DESCRIPTION

Inspection devices are commonly used in order to detect objects of interest, such as defects, within industrial machines. As an example, an inspection device can include a camera that takes pictures of a target portion of a machine, and these pictures can be subsequently analyzed to detect objects of interest within the pictures. By detecting defects, preventative maintenance can be performed before a defect causes a problem, such as machine shutdown, catastrophic failure, and/or worker injury. Analysis of the pictures can be performed using computer vision algorithms that generate predictions, such as detecting the object of interest. However, traditional computer vision algorithms only consider a single picture when generating a prediction, which limits their accuracy.

Embodiments of the present disclosure provide inspection systems and corresponding method which remedy this limitation. As discussed in greater detail below, the inspection system can include an inspection device (e.g., a borescope) that captures images of a target over time during an inspection and employs computer vision algorithms to generate predictions regarding an object of interest within respective images (e.g., detection, identification, tracking, measurement, etc.) In contrast to traditional computer vision algorithms, the computer vision algorithms discussed herein can generate predictions using information in addition to an image being analyzed. The additional information can include temporal data, such as prior frame predictions, as well as relative motion between the camera and the target (e.g., a velocity). This additional information can improve the accuracy of the computer vision predictions. Beneficially, this improved accuracy can reduce the occurrence of inspection errors such as false positives and false negatives. As a result, inspection time and cost can be reduced, as the need to repeat inspections to correct inspection errors can be reduced.

Embodiments of sensing systems and corresponding methods are discussed herein in the context of non-destructive inspection devices such as borescopes. However, it can be appreciated that embodiments of the disclosure are not limited to non-destructive inspection devices and can be employed with other inspection devices without limit.

Figure 1:
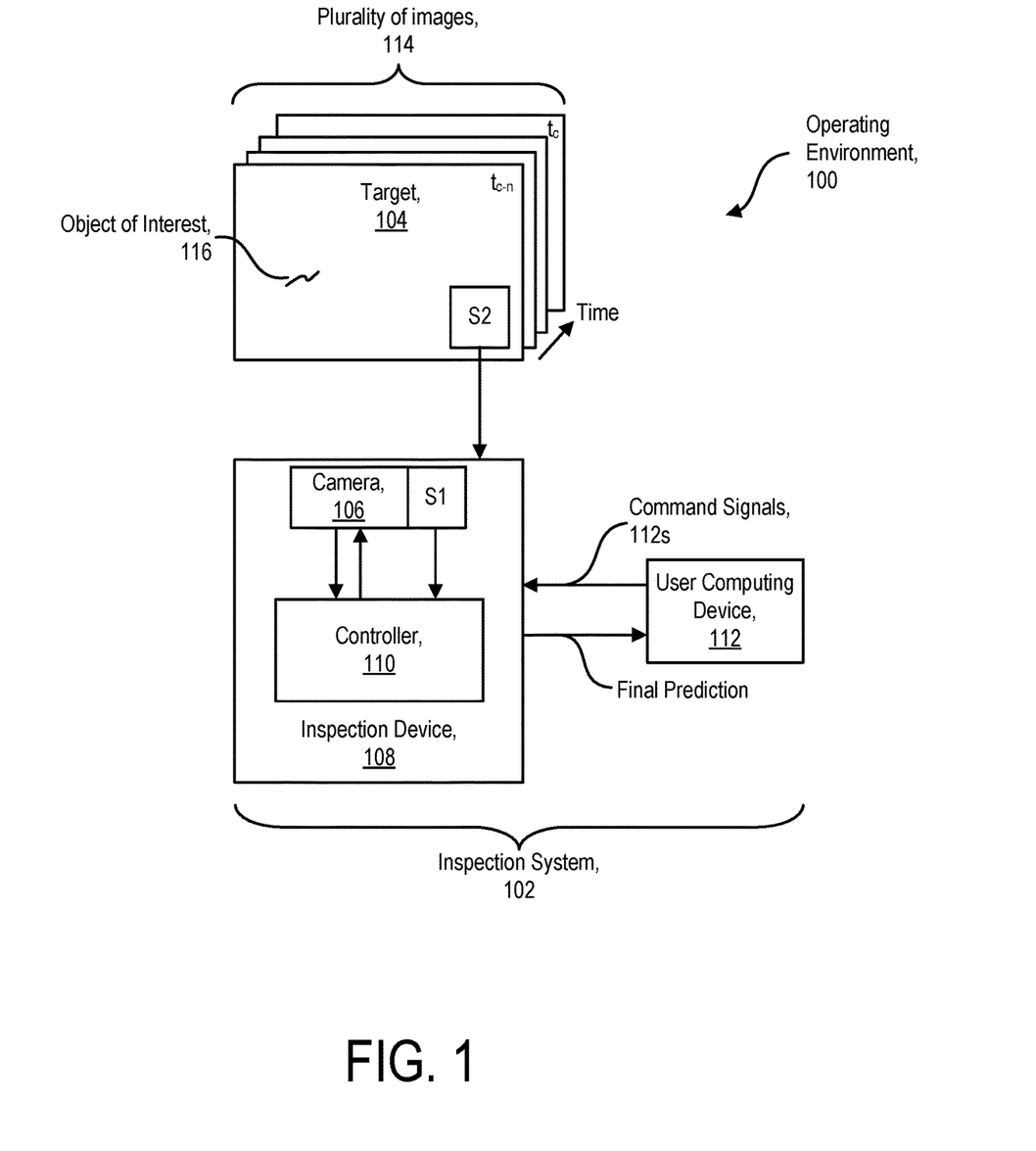
FIG. 1 is a schematic diagram illustrating one exemplary embodiment of an operating environment including an inspection system having a camera configured to capture images of a target and a controller configured to analyze the captured images.

FIG. 1 is a schematic block diagram illustrating one exemplary embodiment of an operating environment 100 including an inspection system 102 and a target 104. As shown, the inspection system 102 includes an inspection device 108, a user computing device 112, and at least one sensor (e.g., S1, S2). The inspection device 108 can include a camera 106 and a controller 110. The controller 110 can be in communication with the camera 106, the user computing device 112, and the at least one sensor. While the user computing device and the inspection device are illustrated as separate components in FIG. 1, in alternative embodiments they can be integrated.

The controller 110 can be configured to transmit one or more command signals 112s to the inspection device 108. The command signals 112s can be operative to command at least one of the camera 106, the at least one sensor, and other components of the inspection device and/or the target not shown (e.g., articulating components), to perform one or more operations as part of an inspection. Such operations can be performed automatically (e.g., in a scripted sequence), manually in response to commands received from the user computer device 112 (e.g., commands entered by a human inspector), adaptive operations control (e.g., subsequent operations executed based upon information received from previous operations), and combinations thereof. Examples of the inspection operations can include, but are not limited to, movement of the target 104, movement of the camera 106, illumination of the target 104, acquisition of measurements by the at least one sensor, acquisition of a plurality of images 114 of the target 104 by the camera 106, analysis of the plurality of acquired images 114, output of analysis results (e.g., to the user computing device 112 for storage and/or display), and the like.

In an embodiment, the target 104 can include a rotating component, such as a shaft or tube. In further embodiments, at least a portion of the inspection system 102 (e.g., a portion of the inspection device 108) can be configured for insertion within the target 104. In additional embodiments, the inspection device 108 can be a non-destructive testing device, such as a borescope. An exemplary embodiment of a borescope is discussed in U.S. Patent Publication No. 2019/0331613, the entirety of which is incorporated by reference herein. It can be appreciated, however, that in alternative embodiments, the inspection system can include other inspection devices including a camera and computing capability to execute a plurality of computer vision algorithms without limit.

Embodiments of the camera 106 can be configured to acquire the plurality of images 114 continuously throughout inspection of the target 104, or a selected portion of an inspection. In one aspect, the camera can be a video camera and the plurality of images can be successive frames of video recorded by the camera. In another aspect, the camera can be a still camera and the plurality of images can be a time ordered sequence of still images.

The at least one sensor can be configured to output motion data to the controller 110 that characterizes movement of the target 104 and the camera 106. The motion data can further characterize orientation of the target 104 and the camera 106 during movement. As an example, the at least one sensor include position sensors, velocity sensors, multi-axis accelerometers (e.g., 3-axis), multi-axis gyroscopes (e.g., 3-axis), multi-axis inertial measurement units (e.g., 9-axis), compasses, and the like. The controller 110 can be further configured to determine a motion parameter characterizing relative motion between the target 104 and the camera 106. Relative motion between the target 104 and the camera 106 can occur due to motion of the target 104 while the camera 106 is stationary, motion of the camera 106 while the target 104 is stationary, or motion of the target 104 and the camera 106 concurrently. Accordingly, embodiments of the at least one sensor can be a single sensor (e.g., S1) mechanically coupled to the camera 106, a single sensor (e.g., S2) mechanically coupled to the target 104, and a plurality of sensors (e.g., S1 and S2) mechanically coupled to the camera 106 and the target 104, respectively. Examples of the motion parameter can include, but are not limited to, position, velocity, acceleration, rotation, angular velocity, angular acceleration, rotation angle (e.g., a relative angle between the target 104 and the camera 106; also referred to as angular position), orientation, and any combination thereof.

The controller 110 can be configured to receive the plurality of images 114 from the camera 106 and execute a plurality of computer vision algorithms based upon the plurality of images 114. In an embodiment, the computer vision algorithms can be configured to generate predictions, also referred to as inferencing, regarding an item of interest 116 within the target 104. As discussed in greater detail below, examples of predictions can include, but are not limited to, classifying the object of interest 116, identifying the object of interest 116, localizing the object of interest 116, tracking the object of interest 116, determination of coloration of the object of interest 116, characterizing at least one geometric feature of the object of interest 116, or any combination thereof. Geometric features of the object of interest 116 can include, but are not limited to, one or more dimensions, shape, orientation, corners, edges, texture, discontinuities, area, volume, and the like.

In general, it can be desirable for the controller 110 to generate the initial predictions on all or substantially all of the plurality of images 114 using the plurality of computer vision algorithms. In one aspect, substantially all of the plurality of images can be a relatively high fraction of the total number of the plurality of images (e.g., greater than or equal to about 90%, 91%, 92%, 93%, 94%, 95%, 96%, 97%, 98%, 99%, etc.) In another aspect, substantially all of the plurality of images can be a number of images of the plurality of images such that temporally adjacent images are separated in time by less than a predetermined time interval.

As discussed in greater detail below, the plurality of computer vision algorithms can include a first computer vision algorithm and a second computer vision algorithm. The first computer vision algorithm can be configured to generate a prediction regarding the target 104 using an image of the plurality of images 114 at a selected time (e.g., a current time). The prediction generated by the first computer vision algorithm can be referred to as an initial prediction herein. In certain embodiments, the initial prediction can be generated by the first computer vision algorithm using only the image being analyzed (the image acquired at the current time).

As noted above without consideration of information other than the image being analyzed, the initial prediction is not optimized and can be improved. Accordingly, the initial prediction can be used as an input to the second computer vision algorithm, along with other information. The prediction generated by the second computer vision can be referred to as a final prediction herein. In one aspect, the additional information can include temporal information, such as a final image prediction generated for a prior captured image and it can be provided in the form of a weighting. In another aspect, the additional information can include motion information characterizing relative movement between the target 104 and the camera 106.

In general, it can be appreciated that correlations can be present between predictions made at different times when considered in combination with relative movement between the target 104 and the camera 106. For example, when an object is predicted to be present in an image, there can be a likelihood that the object of interest is present in a later image. This likelihood can vary depending upon considerations such as the location of the object of interest within the field of view of the image and relative movement of the target 104 and the camera 106. As an example, when the relative movement is large compared to the distance between the object of interest location and the edge of the image in the direction of motion, the object of interest can leave the field of view of the camera by the time the later image is acquired. Thus, the likelihood that the object of interest remains within the later image can be reduced. Conversely, when the relative movement is small compared to the distance between the object of interest location and the edge of the image in the direction of motion, the object of interest can remain within the field of view of the camera when the later image is acquired. Thus, the likelihood that the object of interest remains within the later image can be increased. The weighting can reflect this likelihood and bias the final prediction towards or away from the prior prediction, improving accuracy metrics (e.g., precision and recall) of the later final prediction.

In further embodiments, generation of the first prediction by the first CV algorithm can be omitted. Instead, the second CV algorithm can receive the initial prediction (e.g., a prediction of the location of the object of interest within the current image) from another source, alone or in combination with the current image, as input. As an example, the input can be retrieved from another computing device (e.g., a processor, a data storage device, etc.)

Utilization of temporal information (predictions using prior images) can further allow measurements of three-dimensional features to be approximated with significantly greater accuracy than estimations made from a single two-dimensional image. In one aspect, the number of images available for generating predictions is determined by the elapsed inspection time and the frame rate available for making a determination. Using predictions from analysis of prior images can increase the length of time spent inspecting a region of interest and affect the accuracy of the prediction. Notably, weightings can be configured such that the second CV algorithm relies more heavily on predictions from images taken at preferred distances and relative velocities.

In certain embodiments, the computer vision algorithms can be solely executed by the inspection device (e.g., the controller, alone or in combination with any other computing resources of the inspection device). That is, the inspection device does not output the plurality of images for analysis by another computing device. This configuration can be beneficial for embodiments of the inspection system that are not in communication with cloud-based computing resources via a network. In one aspect, local analysis performed by the inspection device alone can exhibit low to approximately zero latency, as there is no reliance on network bandwidth. As a result, the object of interest can be found in real-time, allowing the operator of the inspection device to make decisions faster. In another aspect, the security of data generated during analysis of the plurality of images is improved, as this data is maintained on the inspection device and not transmitted over a network where it can be exposed. However, it can be appreciated that, in alternative embodiments, images acquired by the inspection device and/or predictions generated by the inspection device (e.g., initial predictions, final predictions, confidence levels, etc.) one or more of the computer vision algorithms can be executed by another computing device, external to the inspection device.

Figure 2:
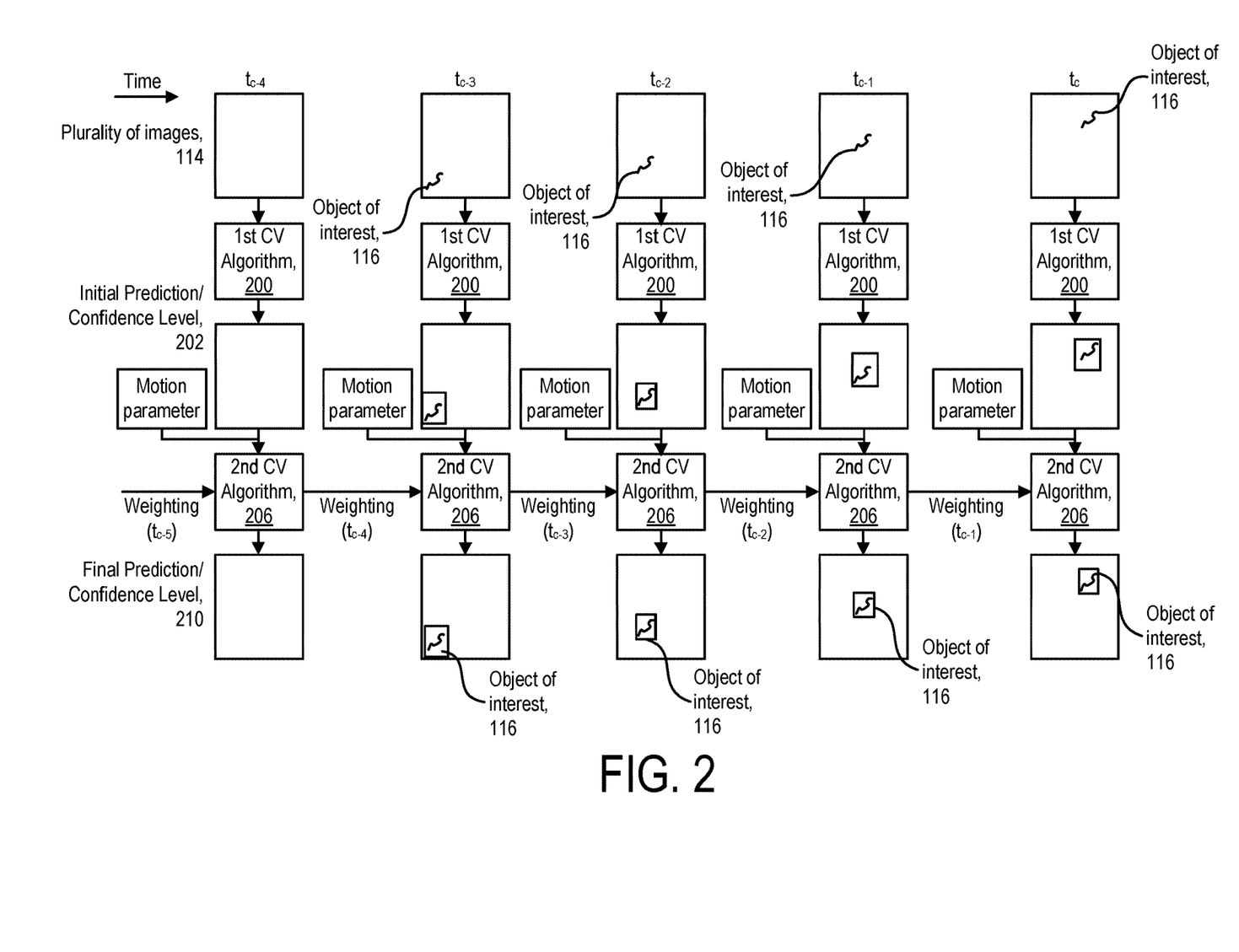
FIG. 2 is a block diagram illustrating one exemplary embodiment of computer vision inferencing performed by the inspection system of FIG. 1.

FIG. 2 is a block diagram illustrating one exemplary embodiment of computer vision inferencing including the first and second computer vision algorithms. A corresponding method 300 of inspection performed by the inspection device 108 is further illustrated in FIG. 3. As shown, the method includes operations 302-320. However, alternative embodiments of the method can include greater or fewer operations than illustrated in FIG. 3 and the operations can be performed in an order different than FIG. 3.

In operation 302, the camera 106 of the inspection system 102 can capture the plurality of images 114 of the target 104. In certain embodiments, the inspection device 108 can be a borescope. The plurality of images 114 can be sequential frames of a video captured by the camera or a time ordered sequence of still images. As shown in FIG. 2, respective images of the plurality of images 114 include images captured at a current time $t_c$ and at least one image captured prior to $t_c$ (e.g., $t_{c-1}$, $t_{c-2}$, $t_{c-3}$, $t_{c-4}$, etc.) In certain embodiments, the time interval between respective images of the plurality of images 114 can be approximately constant.

Figure 3:
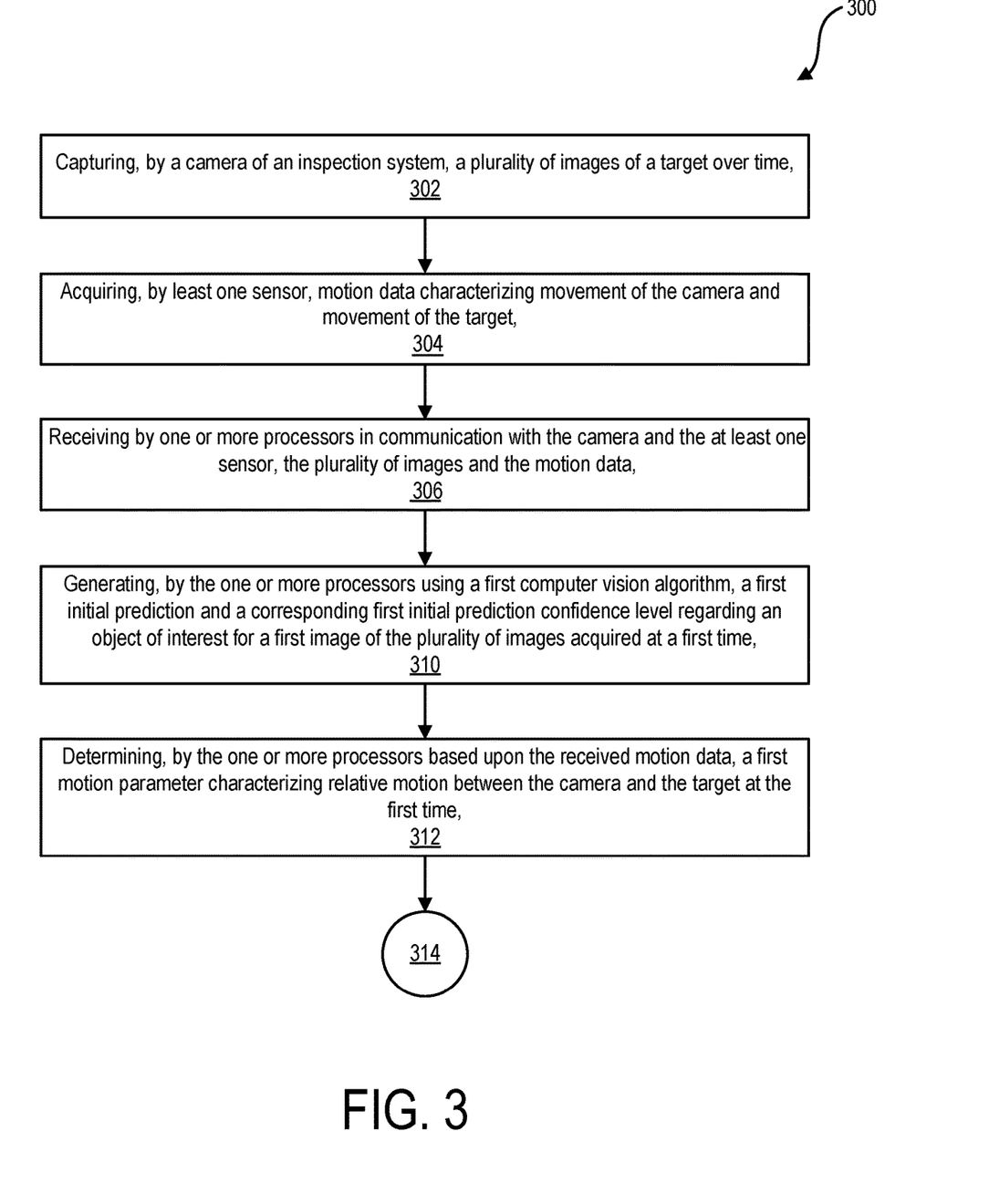
FIG. 3 is a flow diagram illustrating one exemplary embodiment of an inspection method for computer vision inferencing performed by the inspection system of FIG. 1

In operation 304, the at least one sensor can acquire motion data characterizing relative movement between the target 104 and movement of the camera 106. In one embodiment, the camera can move and the target can be still. Accordingly, the at least one sensor can be a sensor (e.g., sensor S1) that is mechanically coupled to the camera. In another embodiment, the target can move and the camera can be still. Accordingly, the at least one sensor can be a sensor (e.g., sensor S2) that is mechanically coupled to the target. In further embodiments, both the target and camera can move concurrently. Accordingly, the at least one sensor can be both the sensor S1 mechanically coupled to the camera and sensor S2 that is mechanically coupled to the target. It can be appreciated that the sensor S1 and S2 can represent one or more sensors. Examples of the sensors can include position sensors, a velocity sensors, multi-axis accelerometers (e.g., 3-axis), multi-axis gyroscopes (e.g., 3-axis), inertial measurement units (e.g., 9-axis), and the like. Thus, the motion data can be one or more of position, velocity, acceleration, rotation, angular velocity, angular acceleration, rotation angle, proximity, or orientation.

In operation 306, one or more processors of the inspection system 102 (e.g., the controller 110) can receive the plurality of images 114 and the motion data. In certain embodiments, the plurality images and the motion data can be received by the controller substantially immediately (e.g., within about 100 ms or less) after acquisition by the camera and the at least one sensor. In this manner, analysis of the plurality of images can be performed substantially in real-time. However, in other embodiments, the plurality of images and the motion data can be stored in a memory after capture (e.g., a memory of the controller, the user computing device, a remote computing device, etc.) and subsequently retrieved by the controller at a later time for analysis.

In operation 310, the controller 110 can employ the first CV algorithm 200 to generate a prediction the first initial prediction and the corresponding first initial prediction confidence level 202 regarding the object of interest 116 for a first image of the plurality of images 114 acquired at a first time. For the discussion below, it is assumed that the first image is acquired at time $t_c$ and is referred to as the current image.

In an embodiment, the object of interest 116 can be a defect. Embodiments of defects can adopt a variety of configurations. Examples can include, but are not limited to, cracks, peeling, changes in surface profile including pits and/or bulges, spots of different color, corrosion, defective welds, absent welds, structural defects (e.g., structural characteristics that do not match a predetermined technical specification), coating loss, erosion, and the like. It can be understood that this discussion is not exhaustive and embodiments of the computer vision algorithms can be configured to make predictions regarding other objects of interest without limit.

Embodiments of the initial prediction can adopt a variety of forms. As an example, the initial prediction can include, but is not limited to, classifying the object of interest 116, identifying the object of interest 116, localizing the object of interest 116, tracking the object of interest 116, characterizing at least one geometric feature of the object of interest 116, or any combination thereof. Geometric features of the object of interest 116 can include, but are not limited to, one or more dimensions, shape, orientation, corners, edges, texture, discontinuities, area, volume, and the like.

In an embodiment, the first CV algorithm 200 can include, but is not limited to, convolutional neural networks (CNNs), and feature extraction (e.g. color detection, edge detection, corner detection, object detection, etc.). Use of CNNs can be beneficial, as they are relatively robust and reliable. Furthermore, they can be trained to identify features that cannot be clearly defined by annotation of individual features.

Classification can determine whether the analyzed image falls within a certain category, such as containing the object of interest 116 or not containing the object of interest 116. It can be appreciated that classification at this level may not determine what the object of interest 116 is, but merely determines that the image may contain a feature that the first CV algorithm 200 recognizes as the object of interest 116.

Detection can identify at least one specific object of interest 116 within the image. In further embodiments, detection can identify multiple objects of interest 116 within the image. As an example, a bounding box can be determined and everything inside the bounding box can be identified.

Localization can specify the location of the object of interest 116 within the image.

Object tracking can monitor the location of at least one object of interest 116 across multiple images of the plurality of images. Object tracking can be performed in a variety of ways. In one embodiment, the object of interest 116 can be tracked using a minimum output sum of least squared error (MOSSE) filter. The MOSSE filter takes a bounding box and updates the subsequent images through the use of a correlation filter. By using a correlation filter the MOSSE tracking algorithm becomes insensitive to factors such as light positioning non-rigid transformations and scale.

In another embodiment, the object of interest 116 can be tracked using a re-identification network combined with an assignment algorithm (e.g., the Kuhn-Munkres Algorithm). In this scenario, an affinity matrix is calculated between the detection and the tracked object. This matrix calculates how similar objects in the image are. Subsequently, an assignment algorithm is used to match tracked objects in the current image to objects in the previous image. The re-identification network can provide another level of specificity by assigning unique identifiers to defects within a specific class. For example, a first crack A is different from a second crack B, so the first crack A will be assigned an identifier of 0 and the second crack B will be assigned an identifier of 1.

In operation 312, the controller 110 can determine the first motion parameter characterizing relative motion between the camera 106 and the target 104 at the first time (e.g., time Q. Examples of the first motion parameter can include, but are not limited to, position, velocity, acceleration, rotation, angular velocity, angular acceleration, rotation angle (e.g., a relative angle between the target 104 and the camera 106), orientation, and any combination thereof.

Once the first initial prediction and the first initial prediction confidence level 202 is generated, it can be fused with the motion parameter (e.g., a velocity) determined for the current and used as input to the second CV algorithm 206 along with the image under consideration for generating a first final prediction and first final prediction confidence level 210 regarding the object of interest 116 for the current image. In this context, fusion can refer to using two separate data sources (e.g., imagery and motion data) as a single input to the second CV algorithm 206.

In operation 314, the controller 110 can also receive a first weighting for use as an input to the second CV algorithm 206. The first weighting can be based upon a second final prediction for a second image acquired at a time prior to the current image. When generating the first final prediction for the current frame acquired at time $t_c$, the second image can be the image acquired at time $t_{c-1}$. In alternative embodiments, the second image can be acquired earlier than time $t_{c-1}$ (e.g., time $t_{c-2}$, $t_{c-3}$, $t_{c-4}$, etc.)

In operation 316, the controller 110 can generate the final prediction and corresponding final prediction confidence level for the current image using the second CV algorithm 206. The current image, the first initial prediction, the first initial confidence level, the first motion parameter, and the first weighting. As discussed above, use of the first weighting and the first motion parameter in combination with the current image as inputs to the second CV algorithm 206 can provide improved accuracy of the first final prediction as compared to use of the current image alone.

In an embodiment, the second CV algorithm 206 can include, but is not limited to, recurrent neural networks (RNNs). Examples of RNNs can include, but are not limited to, Long Short Term Memory (LSTM) networks and other networks that form a temporal sequence.

In operation 320, the controller 110 can output the first final prediction and the first final prediction confidence level 210. In one aspect, the first final prediction and the first final prediction confidence level 210 can be output to the user computing device 112 for display and/or storage. In another aspect, the first final prediction and the first final prediction confidence level 210 can be stored in a memory and later retrieved by the controller 110 for use in generating the final prediction for an image captured after the current time.

As noted above, the first weighting is based upon a second image acquired at a second time prior to the current time $t_c$ (e.g., time $t_c$ or earlier). That is, the second weighting can be based upon a second final prediction and a second final prediction confidence level generated for the prior image captured at time $t_{c-1}$ or earlier using operations 302-316. A predetermined weight can be employed under circumstances where a weighting determined from analysis of a prior image is not available (e.g., when analyzing a first acquired image). The predetermined weight can be received from operator input or a memory device.

Exemplary technical effects of the methods, systems, and devices described herein include, by way of non-limiting example to provide improved computer vision inferencing regarding an object of interest for a plurality of images of a target captured by a camera. Predictions for an image captured at a current time are generated not only using an image captured at the current time but also a prediction generated for an image captured at a prior time and measurements of relative motion between the camera and the target. Beneficially, the accuracy of prediction metrics, such as precision and recall can be improved. Furthermore, utilization of temporal data can allows measurements of three-dimensional features to be approximated with significantly greater accuracy than estimations made from a single two-dimensional image. By improving accuracy of predictions (e.g., detection, identification, quantification of objects of interest existing within the target), unnecessary teardowns of machines including the target and failures in service can be reduced. Additionally, more accurate predictions can allow the frequency of inspection to be reduced and/or reduce the need to repeat inspection, lowering the time and cost of inspection.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. An inspection system, comprising:
a camera configured to acquire a plurality of images of a target over time;
at least one sensor configured to acquire motion data characterizing movement of the camera and movement of the target;
a controller including one or more processors in communication with the camera and the at least one sensor, the controller being configured to:
receive the plurality of images and the motion data;
generate, using a first computer vision algorithm, a first initial prediction and a corresponding first initial prediction confidence level regarding an object of interest for a first image of the plurality of images acquired at a first time;
determine, based upon the received motion data, a first motion parameter characterizing relative motion between the camera and the target at the first time;
receive a first weighting based upon a second image acquired at a second time prior to the first time;
generate, using a second computer vision algorithm, a first final prediction and a corresponding first final prediction confidence level for the first image based upon the first image, the first initial prediction, the first initial confidence level, the first motion parameter, and the first weighting; and
output the first final prediction and the first final prediction confidence level.

2. The system of claim 1, wherein the controller is further configured to generate the first weighting from a third prediction and a corresponding third prediction confidence level, wherein the third prediction and the third prediction confidence level are generated using the second computer vision algorithm based upon the second image, a second initial prediction and a corresponding second initial prediction confidence level generated by the first computer vision algorithm for the second image, a second motion parameter characterizing relative motion between the camera and the target at the second time, and a second weighting based upon a third image acquired at a third time prior to the second time.

3. The system of claim 1, the method of claim 1, wherein the first computer vision algorithm comprises a convolutional neural network (CNN) or feature extraction.

4. The system of claim 1, wherein the second computer vision algorithm comprises a recurrent neural network (RNN).

5. The system of claim 4, wherein the second computer vision algorithm comprises a Long Short Term Memory (LSTM) network.

6. The system of claim 1, wherein the initial and final predictions comprise at least one of classifying the object of interest, detecting the object of interest, localizing the object of interest, tracking the object of interest, determination of coloration of the object of interest, or characterizing at least one geometric feature of the object of interest.

7. The system of claim 1, wherein the controller is further configured to determine the initial prediction, the initial prediction confidence level, the final prediction, and the final prediction confidence level for all of the plurality of images.

8. The system of claim 1, wherein the predetermined object of interest is a defect.

9. The method of claim 1, wherein the motion parameter comprises at least one of position, velocity, acceleration, rotation, angular velocity, angular acceleration, rotation angle, or orientation.

10. A method of inspecting a target, comprising:
capturing, by a camera of an inspection system, a plurality of images of a target over time;
acquiring, by least one sensor, motion data characterizing movement of the camera and movement of the target;
receiving by one or more processors in communication with the camera and the at least one sensor, the plurality of images and the motion data;
generating, by the one or more processors using a first computer vision algorithm, a first initial prediction and a corresponding first initial prediction confidence level regarding an object of interest for a first image of the plurality of images acquired at a first time;
determining, by the one or more processors based upon the received motion data, a first motion parameter characterizing relative motion between the camera and the target at the first time;
receiving, by the one or more processors, a first weighting based upon a second image acquired at a second time prior to the first time;
generating, by the one or more processors using a second computer vision algorithm, a first final prediction and a corresponding first final prediction confidence level for the first image based upon the first image, the first initial prediction, the first initial confidence level, the first motion parameter, and the first weighting; and
outputting, by the one or more processors, the first final prediction and the first final prediction confidence level.

11. The method of claim 10, wherein the controller is further configured to generate the first weighting from a third prediction and a corresponding third prediction confidence level, wherein the third prediction and the third prediction confidence level are generated using the second computer vision algorithm based upon the second image, a second initial prediction and a corresponding second initial prediction confidence level generated by the first computer vision algorithm for the second image, a second motion parameter characterizing relative motion between the camera and the target at the second time, and a second weighting based upon a third image acquired at a third time prior to the second time.

12. The method of claim 10, the method of claim 1, wherein the first computer vision algorithm comprises a convolutional neural network (CNN) or feature extraction.

13. The method of claim 10, wherein the second computer vision algorithm comprises a recurrent neural network (RNN).

14. The method of claim 13, wherein the second computer vision algorithm comprises a Long Short Term Memory (LSTM) network.

15. The method of claim 10, wherein the initial and final predictions comprise at least one of classifying the object of interest, detecting the object of interest, localizing the object of interest, tracking the object of interest, determination of coloration of the object of interest, or characterizing at least one geometric feature of the object of interest.

16. The method of claim 10, wherein the controller is further configured to determine the initial prediction, the initial prediction confidence level, the final prediction, and the final prediction confidence level for all of the plurality of images.

17. The method of claim 10, wherein the predetermined object of interest is a defect.

18. The method of claim 10, wherein the motion parameter comprises at least one of position, velocity, acceleration, rotation, angular velocity, angular acceleration, rotation angle, or orientation.

* * * * *